Nov. 19, 1940.  R. S. TAYLOR  2,222,548
REFRIGERATION
Filed May 12, 1939   2 Sheets-Sheet 1

INVENTOR.
Robert S. Taylor
BY
D. E. Heath
ATTORNEY.

Patented Nov. 19, 1940

2,222,548

UNITED STATES PATENT OFFICE 2,222,548

REFRIGERATION

Robert S. Taylor, Evansville, Ind., assignor to Servel, Inc., New York, N. Y., a corporation of Delaware Application May 12, 1939, Serial No. 273,195

4 Claims. (Cl. 62—119.5)

My invention relates to the art of refrigeration and more particularly to absorption refrigerating apparatus of the uniform pressure type, and to a method of producing refrigeration thereby.

Among the objects of my invention are to provide an improved apparatus for and method of exchanging heat between the fluids in such a system. Another object of my invention is to improve the separation of vapor of absorption liquid from vaporous refrigerant.

In accordance with my invention the strong absorption liquid formed in the absorber is divided into two streams. One of these streams is brought into heat exchange relation with hot weak absorption fluid flowing from the generator to the absorber, while the other stream is brought into contact with the vapor produced in the generator. The first stream serves to cool the weak absorption liquid to substantially absorber temperature, while at the same time being itself heated to substantially generator temperature. The other stream serves to cool the vapor produced in the generator to substantially condenser temperature, thus causing the condensation of vapor of absorption liquid from the mixture of this vapor with refrigerant vapor. At the same time, this other stream of strong absorption liquid is heated by the vapors to substantially generator temperature.

Further objects and advantages of my invention will be apparent from the following description considered in connection with the accompanying drawings which form part of this specification and of which:

Figure 1:
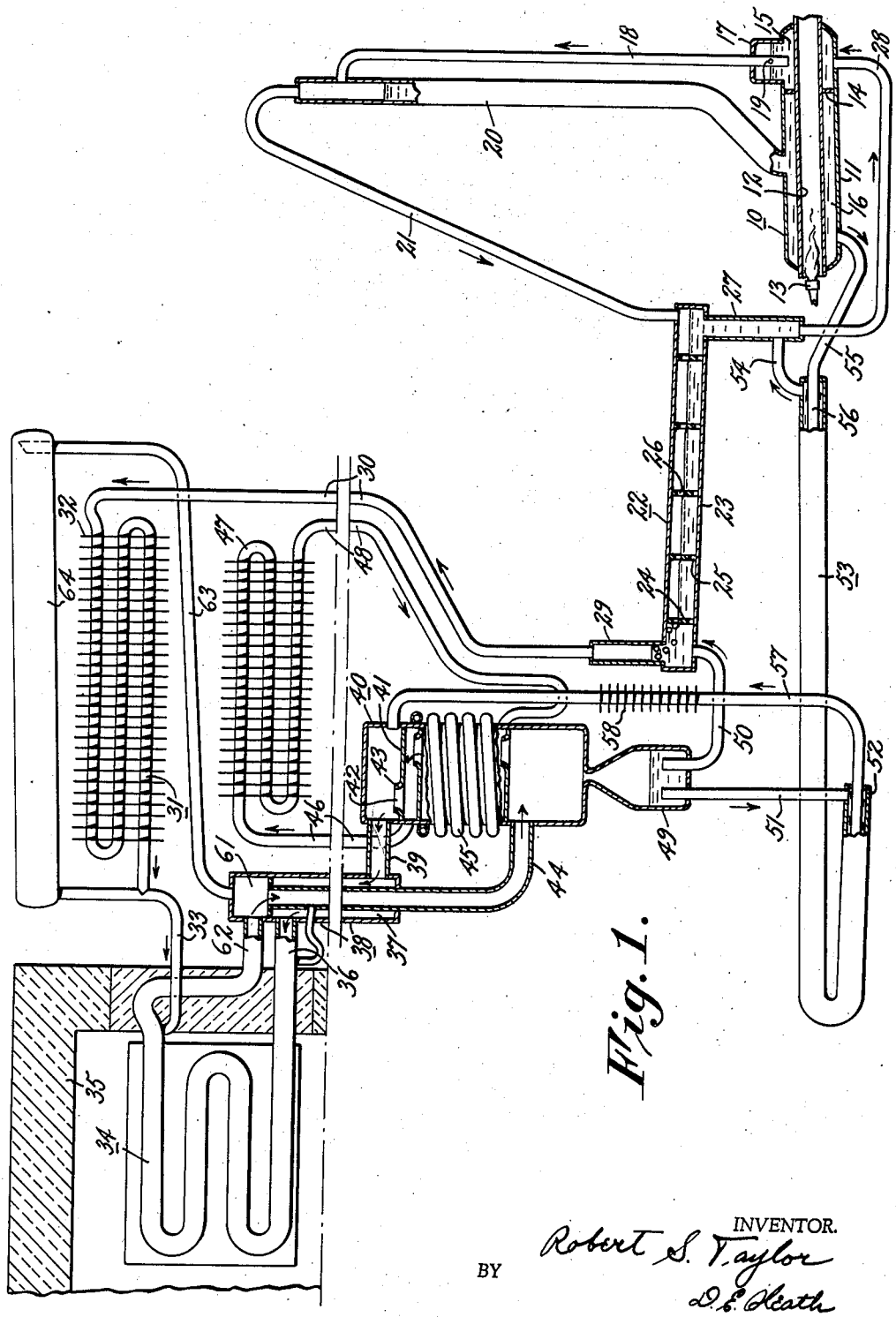
Fig. 1 is a cross-sectional view showing one embodiment of my invention.

Referring more particularly to Fig. 1, reference character 10 designates generally a generator consisting of an outer shell 11 through which extends a flue 12. The flue is arranged to be heated in any suitable manner, as by the gas burner 13. A partition 14 divides the annular space between the shell 11 and flue 12 into a chamber 15 and a chamber 16. A vapor dome 17 is provided at the upper side of chamber 15. A vapor lift pipe 18 extends to within chamber 15 and is formed with an open lower end and one or more apertures 19. The upper end of pipe 18 opens into a standpipe 20, the lower end of which communicates with the liquid chamber 16.

A conduit 21 leads from the upper end of pipe 20 to one end of an analyzer vessel 22. This vessel includes a substantially horizontal portion 23 throughout the length of which is distributed a series of partitions 24. Each partition is formed with a lower aperture 25 and one or more upper apertures 26. The apertures 25 are preferably at the lowermost edges of the plates so that liquid may flow along the bottom of the analyzer, thus preventing stagnation of liquid between the plates. The apertures 26 are below the uppermost edges of the plates so that vapor in passing through them is forced to bubble through the liquid. A downwardly extending leg 27 communicates with the same end of the analyzer to which is connected conduit 21. A conduit 28 connects the lower end of leg 27 with chamber 15 of the generator.

The opposite end of the analyzer is provided with an upwardly extending leg 29, to the upper end of which is connected a conduit 30 which leads to a condenser 31. As shown, the condenser is air cooled, heat radiating fins 32 being provided for the transfer of heat to the air. The lower end of the condenser is connected to a pipe 33 which leads to the upper part of an evaporator coil 34. This coil is disposed within the region to be refrigerated, which region is preferably enclosed by means of heat insulating walls 35.

The lower end of the evaporator is connected by means of a conduit 36 to a compartment 37 formed in a gas heat exchanger 38. The other end of this compartment is connected by a conduit 39 to the upper part of an absorber vessel 40.

The absorber is provided with a plurality of transverse horizontal plates 41 formed with apertures 42 which are surrounded by raised rims 43, the apertures in adjacent plates being out of alignment. A conduit 44 communicates with the absorber vessel 40 below the lowermost plate 41 therein and extends within the compartment 37 formed in gas heat exchanger 38 and communicates with a space 61 at the upper end of the heat exchanger. A conduit 62 connects chamber 61 with the upper end of the evaporator coil 34. A conduit 63 also communicates with chamber 61 and with one end of a vessel 64 having substantial volume. Conduit 33 connects the other end of this vessel with the outlet of condenser 31.

A coil 45 for cooling fluid is in heat exchange relation with absorber 40. The upper end of this coil is connected by means of a conduit 46 with the upper end of a condenser 47, while the lower end of the condenser is connected to the lower end of coil 45 by means of a conduit 48. Coil 45, conduit 46, condenser 47, and conduit 48 form a closed system which is entirely out of communication with the refrigerating system proper.

The lower end of absorber 40 is formed as a liquid sump 49. A conduit 50 connects this sump with that end of analyzer 22 which is provided with the upwardly extending leg 29. A conduit 51 connects sump 49 with the outer member 52 of a liquid heat exchanger 53. The opposite end of member 52 is connected by means of a conduit 54 with the downwardly extending leg 27 of the analyzer. A conduit 55 communicates with the lower part of liquid chamber 16 of the generator and is connected to the inner member 56 of the liquid heat exchanger. A conduit 57 is connected to the other end of the inner member 56 and communicates with the upper part of an absorber 40 above the uppermost plate 41 therein. If desired, heat transfer fins 58 may be placed on conduit 57.

The above described device operates as follows:

The apparatus is charged with a refrigerant, such as ammonia, dissolved in a liquid absorbent such as water. Inert gas, such as hydrogen, is also introduced into the apparatus.

Upon application of heat to the generator 10, vapor is produced in both chambers 15 and 16, this vapor consisting primarily of ammonia vapor, but unavoidably also including some water vapor. The vapor produced in chamber 15 accumulates in the dome 17 and depresses the liquid level until the port 19 is uncovered. Thereupon, vapor enters the pipe 18 through the port and, in well known manner, serves to lift liquid upwardly through the pipe 18 whence it is discharged into the pipe 20. The vapor produced in the chamber 16 passes upwardly through the pipe 20 and joins the vapor from the pipe 18.

The vapor which thus reaches the upper end of standpipe 20 passes through conduit 21 to the analyzer 22, where the vapor is brought into contact with strong and relatively cold absorption liquid. The temperature of the vapor is reduced and substantially all of the water vapor is condensed, it having a higher boiling point than the ammonia. The ammonia vapor is cooled by contact with the strong liquid, but not sufficiently to cause its condensation. Due to the fact that the liquid already contains a large amount of ammonia in solution, it is not able to absorb the ammonia vapor and the latter passes into the upwardly extending leg 29 practically freed from water vapor. At the same time, the strong absorption liquid has been heated by contact with the hot vapors and some of the ammonia has been driven from solution therein, and likewise passes into the upwardly extending leg 29. From here the ammonia vapor passes through conduit 30 to condenser 31, where it is cooled by giving up heat to the air in contact with fins 32. Due to this cooling, the ammonia vapor is condensed and the liquid ammonia flows from the condenser by gravity through conduit 33 to the evaporator 34.

Inert gas is introduced into the evaporator through conduit 36, as will be explained hereinafter, with the result that the partial pressure of the ammonia in the evaporator is reduced in accordance with Dalton's law and the liquid ammonia under this reduced partial pressure evaporates, thus absorbing heat and producing refrigeration within the space enclosed by the walls 35. The cold mixture of ammonia vapor and inert gas flows out of the evaporator through the conduit 62 to the space 61 within the gas heat exchanger 38. From the space 61 it passes through the conduit 44, thus being brought into heat exchange relation with warmer gas in the space 37 and an exchange of heat takes place.

The mixture of inert gas and refrigerant vapor is introduced into the lower part of the absorber and passes upwardly through the apertures 42 formed in the plates 41. As will be presently explained, weak absorption liquid is introduced into the upper part of the absorber through the conduit 57 and forms pools on the plates. As soon as these pools have reached a sufficient depth, liquid overflows the rims 43. Thus, the gaseous mixture is forced to pass upwardly through absorption liquid cascading downwardly through the absorber, with the result that the refrigerant vapor is absorbed. The inert gas, on the other hand, not being absorbable to any great extent by the water, flows out from the top of the absorber through the conduit 39 to the space 37 in the gas heat exchanger.

The absorption process is accompanied by the generation of heat and consequently the inert gas is heated. As above explained, this heat is given up to the cold mixture of inert gas and refrigerant vapor passing through the conduit 44. From the upper end of space 37 the inert gas passes through the conduit 36 to the lower end of the evaporator, through which it flows counter-current to the refrigerant.

The absorber is located at a lower level than the evaporator and the circulation of gas between and through these vessels is caused by virtue of the fact that the mixture of refrigerant vapor and inert gas present in the conduit 44 has a greater specific gravity than the substantially pure inert gas present in the space 37 of the heat exchanger.

Coil 45 contains a fluid which, under the pressure existing in the coil, has a boiling point substantially the same as the temperature which it is desired to maintain in the absorber. Consequently, the heat resulting from the absorption process flows from the absorber to the fluid within coil 45, and causes such liquid to boil. The vapor produced flows through conduit 46 to the condenser 47, where its temperature is reduced and it is condensed. The condensate flows by gravity through the conduit 48 back to the lower end of the coil 45.

The strong absorption liquid formed in the absorber 40 collects in the sump 49, whence it flows in two streams, one passing through the conduit 50, while the other passes through the conduit 51. The liquid which flows through the conduit 50 is introduced into the analyzer 22 where, in the manner previously described, it serves to cool the hot mixture of vapors coming from the generator, with the result that water vapor present in this mixture is condensed. At the same time, the strong absorption liquid is heated by the vapors to substantially generator temperature. From the downwardly extending leg 27 this preheated strong absorption liquid flows through the conduit 28 to the generator chamber 15.

The strong absorption liquid which passes through the conduit 51 from the sump enters the outer member 52 of the liquid heat exchanger where it is brought into heat exchange relation with hot weak absorption liquid flowing from chamber 16 of the generator. This portion of the strong absorption liquid is preheated to substantially generator temperature and flows through the conduit 59 to join the absorption liquid which has passed through the analyzer and flows together with it through the conduit 28.

The upper end of standpipe 18 is at a higher elevation than the top of the absorber 40. The liquid level is maintained in pipe 20 at such a height that liquid will flow by gravity from the chamber 16 through the conduit 55, the inner member 56 of the heat exchanger 53 and the conduit 57 to the upper part of the absorber. In flowing through the heat exchanger, this liquid gives up heat to the cooler strong absorption liquid in the outer member 52. It may further be cooled through radiation of heat from the fins 58.

Under normal operating conditions vessel 64 contains chiefly hydrogen gas which is substantially stagnant therein. The pressure existing within the system is such that ammonia gas is condensed at the temperature in the condenser 31 which is attainable through air cooling. However, should the temperature of the air rise, ammonia vapor will pass through the condenser without being condensed, thus increasing the pressure in the system and making condensation possible at the increased temperature. The ammonia vapor which passes through the condenser flows upwardly through conduit 33 to the vessel 64, thus displacing hydrogen gas therefrom. The displaced gas flows through the conduit 63 to the space 61 in the gas heat exchanger. The ammonia vapor introduced into vessel 64 remains there until the temperature of the cooling air is decreased, whereupon the lower pressure resulting in the condenser withdraws the ammonia vapor from the vessel. Thus, during periods of high air temperature, a certain amount of refrigerant is withdrawn from active participation in the system.

Figure 2:
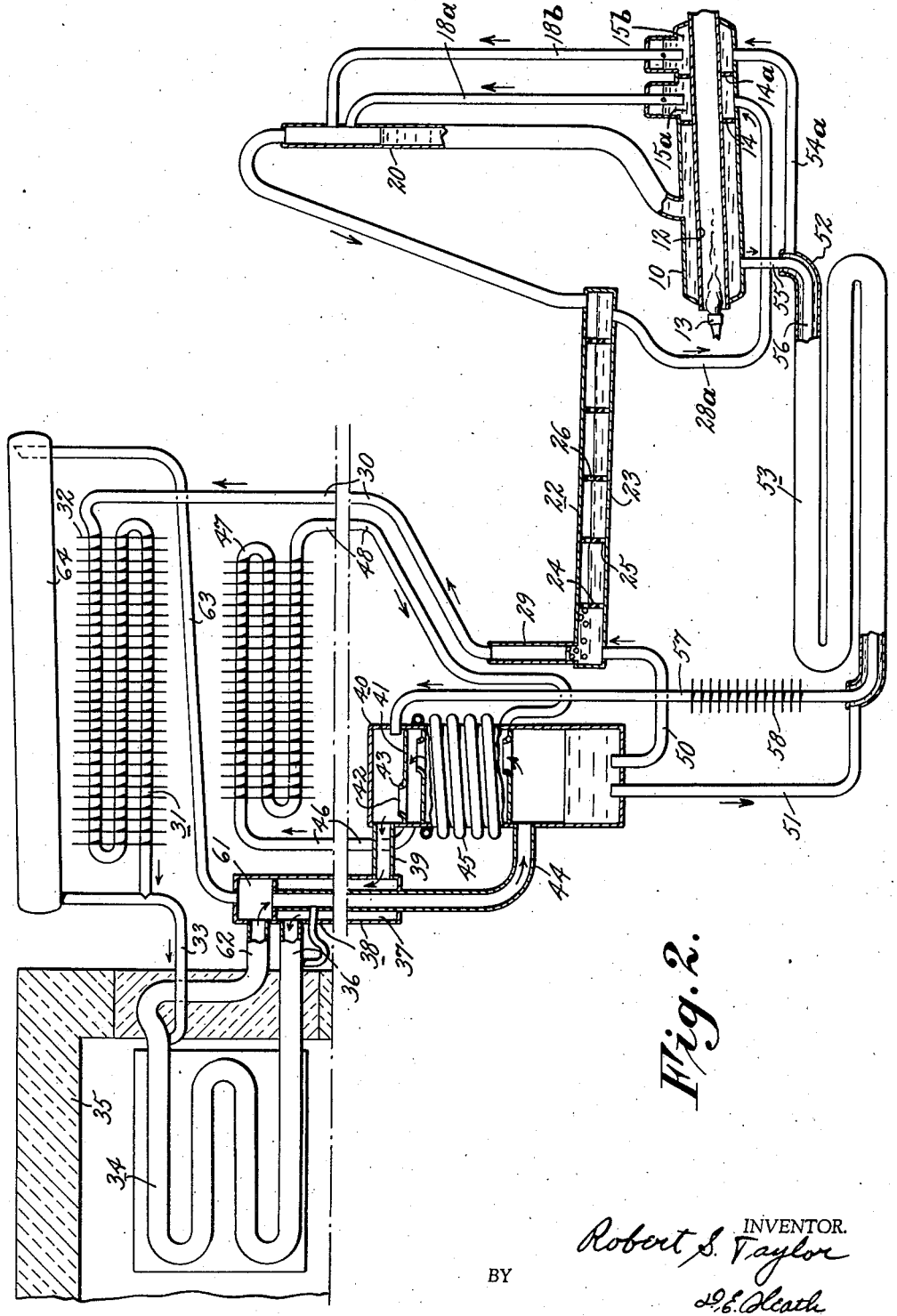
Fig. 2 is a similar view showing another embodiment.

In the embodiment illustrated in Fig. 2, parts which correspond to those in Fig. 1 are designated by the same reference characters. The difference between the two embodiments resides chiefly in the fact that, in Fig. 2, two chambers 15a and 15b, separated by a partition 14a, are provided in the generator. A conduit 28a connects the analyzer 22 with chamber 15a, while a conduit 54a connects the outer member 52 of the liquid heat exchanger 53 with chamber 15b. Conduits 18a and 18b extend from within chambers 14a and 15b, respectively, to the upper part of standpipe 20. Otherwise, the apparatus shown in this figure is essentially the same as that shown in Fig. 1.

Likewise, the operation of this apparatus is similar to that of the apparatus illustrated in Fig. 1, with the exception that the strong absorption liquid which flows from the absorber through the analyzer 22 is lifted to the upper part of the conduit 20 independently of the strong absorption liquid which flows from the absorber through the heat exchanger 53. Due to the fact that separate vapor lifts are provided for these two streams, the division of the strong absorption liquid between the two may be determined by the lifting effects of the two vapor lifts.

The relative amounts of strong absorption liquid flowing through the analyzer 22 and the heat exchanger 53, respectively, should be so regulated as to be in proportion to the amount of heat which it is desired to take up from the vapor and the weak absorption liquid, respectively.

While I have illustrated and described two more or less specific embodiments of my invention, it is to be understood that this has been done for purposes of illustration only and the scope of my invention is not to be limited thereby, but is to be determined by the following claims.

What is claimed is:

1. In an absorption refrigerating apparatus, a generator including a vapor liquid lift, an analyzer, an absorber, means for conducting weak absorption liquid from said generator to said absorber, means for conducting a portion of the strong absorption liquid from the absorber to said lift in heat exchange relation with said weak liquid, means for conducting another portion of said strong absorption liquid from the absorber to said analyzer, means for conducting the liquid from the analyzer to said lift, and means for conducting vapor from said generator to the analyzer.

2. In an absorption refrigerating apparatus, an absorber having a liquid sump, a generator having a vapor liquid lift chamber located below the liquid level in said sump, an analyzer below said level and above said chamber, means for conducting weak absorption liquid from said generator to said absorber, means for conducting a portion of the strong absorption liquid from said sump to the generator in heat exchange relation with said weak liquid, means for conducting another portion of said strong absorption liquid from said sump by gravity flow to said analyzer, means for conducting liquid from said analyzer to said lift chamber by gravity flow, and means for conducting vapor from said generator to said analyzer.

3. In an absorption refrigerating apparatus, a generator, an elongated analyzer, an absorber, means for conducting weak absorption liquid from said generator to said absorber, means for conducting a portion of the strong absorption liquid from said absorber to one end of the analyzer, means for conducting another portion of said strong absorption liquid from said absorber in heat exchange relation with said weak absorption liquid to the other end of said analyzer, means for conducting liquid from said other end of the analyzer to said generator, and means for conducting vapor from said generator to said other end of said analyzer.

4. That improvement in the art of refrigeration which includes absorbing refrigerant vapor in an absorption liquid to form a strong solution, flowing a portion of said strong solution to a region of high temperature to evaporate refrigerant vapor therefrom and to form a weak solution, passing said vapor in direct contact with another portion of said strong solution, transferring heat from said weak solution to the first mentioned portion of said strong solution, uniting said portions to form a single stream, and elevating said stream by the application of heat thereto.

ROBERT S. TAYLOR.